United States Patent
Ito

(10) Patent No.: US 11,300,159 B2
(45) Date of Patent: *Apr. 12, 2022

(54) ABNORMALITY DETECTION DEVICE FOR ROLLING BEARING

(71) Applicant: NTN CORPORATION, Osaka (JP)

(72) Inventor: Hiroyoshi Ito, Mie (JP)

(73) Assignee: NTN Corporation, Osaka (JP)

( * ) Notice: Subject to any disclaimer, the term of this patent is extended or adjusted under 35 U.S.C. 154(b) by 322 days.

This patent is subject to a terminal disclaimer.

(21) Appl. No.: 16/468,396

(22) PCT Filed: Dec. 11, 2017

(86) PCT No.: PCT/JP2017/044288
§ 371 (c)(1),
(2) Date: Jun. 11, 2019

(87) PCT Pub. No.: WO2018/110479
PCT Pub. Date: Jun. 21, 2018

(65) Prior Publication Data
US 2021/0277955 A1  Sep. 9, 2021

(30) Foreign Application Priority Data
Dec. 13, 2016 (JP) .............................. JP2016-241308

(51) Int. Cl.
*F16C 19/36* (2006.01)
*F16C 19/38* (2006.01)
(Continued)

(52) U.S. Cl.
CPC ............ *F16C 41/00* (2013.01); *F16C 19/364* (2013.01); *F16C 19/38* (2013.01); *F16C 19/52* (2013.01);
(Continued)

(58) Field of Classification Search
CPC ........ F16C 19/364; F16C 19/38; F16C 19/52; F16C 19/541; F16C 33/667; F16C 33/82;
(Continued)

(56) References Cited

U.S. PATENT DOCUMENTS 4,070,660 A * 1/1978 Tauber ............... G01N 33/2858
340/631
5,725,357 A * 3/1998 Nakazeki ........... G05D 16/2066
417/18
(Continued)

FOREIGN PATENT DOCUMENTS

JP 5-40698 6/1993
JP 7-280180 10/1995
(Continued)

OTHER PUBLICATIONS

International Search Report dated Mar. 13, 2018 in International (PCT) Application No. PCT/JP2017/044288.
(Continued)

*Primary Examiner* — Marcus Charles
(74) *Attorney, Agent, or Firm* — Wenderoth, Lind & Ponack, L.L.P.

(57) ABSTRACT

An abnormality detection device for a rolling bearing includes a filter that allows passage of lubricating oil, while preventing passage of metal pieces, from the bearing space between the outer ring and the inner ring of the rolling bearing to the exterior of the bearing space. The device further includes an electrical circuit including a pair of permanent magnets mounted, as a pair of electrodes, to the filter so as to be spaced apart from each other, and electrical lines extending from the respective electrodes to a power source. A state detector detects a change in electrical output from the electrical circuit when metal pieces adhere between
(Continued)

the pair of permanent magnets, thereby detecting the state of the metal pieces contained in the lubricating oil.

20 Claims, 9 Drawing Sheets

(51) Int. Cl.
*F16C 19/52* (2006.01)
*F16C 33/66* (2006.01)
*F16C 33/82* (2006.01)
*F16N 29/04* (2006.01)
*F16C 41/00* (2006.01)

(52) U.S. Cl.
CPC ............ *F16C 33/667* (2013.01); *F16C 33/82* (2013.01); *F16N 29/04* (2013.01); *F16C 2233/00* (2013.01); *F16N 2200/04* (2013.01); *F16N 2210/14* (2013.01)

(58) Field of Classification Search
CPC ........ F16C 41/00; F16C 41/005; F16C 29/04; F16C 2233/00; F16C 2240/46; F16C 19/383; F16N 29/04; F16N 2210/14; F16N 2200/04; F16N 2260/30
See application file for complete search history.

(56) References Cited

U.S. PATENT DOCUMENTS

| | | | |
|---|---|---|---|
| 6,546,785 B1* | 4/2003 | Discenzo | F16C 19/52 73/53.05 |
| 7,134,323 B1* | 11/2006 | Discenzo | G01N 33/2888 73/53.05 |
| 7,493,799 B1* | 2/2009 | Discenzo | F16C 19/52 184/108 |
| 8,531,672 B2* | 9/2013 | Takahashi | G01N 21/59 356/442 |
| 9,933,018 B2* | 4/2018 | Dittes | F16C 19/52 |
| 9,938,866 B2* | 4/2018 | Borek | F16C 33/667 |
| 9,995,344 B2* | 6/2018 | Dittes | F16C 41/002 |
| 10,705,039 B2* | 7/2020 | Kiriyama | G01N 33/2858 |
| 2003/0221911 A1* | 12/2003 | Eriksen | F16C 33/6674 184/6.4 |
| 2014/0007657 A1 | 1/2014 | Matsubara et al. | |
| 2016/0108962 A1 | 4/2016 | Miyazaki et al. | |
| 2018/0223907 A1 | 8/2018 | Ito et al. | |

FOREIGN PATENT DOCUMENTS

| | | |
|---|---|---|
| JP | 2004-293776 | 10/2004 |
| JP | 2012-181169 | 9/2012 |
| JP | 2014-231856 | 12/2014 |
| JP | 2017032112 A * | 2/2017 |
| WO | 2017/022682 | 2/2017 |

OTHER PUBLICATIONS

International Preliminary Report on Patentability dated Jun. 18, 2019 in International (PCT) Application No. PCT/JP2017/044288, with English translation.

* cited by examiner

ABNORMALITY DETECTION DEVICE FOR ROLLING BEARING

CROSS-REFERENCE TO RELATED APPLICATION

This application is a national stage application of International application No. PCT/JP2017/044288, filed Dec. 11, 2017, which claims benefit of priority of Japanese Patent Application No. 2016-241308, filed Dec. 13, 2016, the entire contents of which are incorporated herein by reference.

TECHNICAL FIELD

The present invention relates to an abnormality detection device for a rolling bearing lubricated by oil.

BACKGROUND ART

Rolling bearings are mounted to movable portions of transportation machines, industrial machines, or various other machines. Some of such machines include an operation mechanism which needs to be lubricated by oil, such as the portions of gears meshing with each other, or the portions of components in sliding contact with each other, and are configured such that the operation mechanism and the rolling bearings are lubricated by common oil.

For example, an oil pump includes, in its interior, rolling bearings and an operation mechanism, and is capable of sending lubricating oil contained in the oil pump toward an operation mechanism located outside the oil pump.

Foreign objects such as iron dust and other wear dust may be produced in the bearing space defined between the inner and outer rings of a rolling bearing.

If such foreign objects enter (flow into) the operation mechanism in the lubricating oil circulation, path, they could get stuck in the mechanism, thus reducing the durability of the oil pump, or worse, leading to malfunction, failure or breakage of the oil pump.

In order to avoid such a situation, for example, JP H07-280180A discloses a method for detecting contamination of lubricating oil in a circulation path with foreign objects such as iron dust. In this method, an alarm is generated if iron dust in the lubricating oil is attracted to a magnet of a sensor and accumulates until the magnet is electrically connected to a metal casing through the accumulated foreign objects.

As described above, it is not preferable that foreign objects such as iron dust produced in the rolling bearing enter the operation mechanism in the lubricating oil circulation path.

In particular, large peel-off pieces which are considered to he produced in the bearing space of a rolling bearing used in an oil pump tend to cause a more serious trouble, such as malfunction, failure or breakage, of the operation mechanism of the oil pump itself, and/or other operation mechanisms located in the lubricating oil circulation path leading to the oil pump.

Thus, in order to prevent such foreign objects flowing out of the rolling bearing, or to recover such foreign objects, it is necessary to detect foreign objects produced in the rolling bearing.

In JP H07-280180A, the magnet of the sensor is located in the lubricating oil circulation path, but most foreign objects mixed into the lubricating oil in the circulation path may pass by the magnet without being attracted to the magnet.

Also, in JP H07-280180A, the magnet catches only a minimum amount of foreign objects necessary to measure the amount of the foreign objects in the lubricating oil. Also, it is impossible to measure the amount of the foreign objects that pass by the magnet without being caught by the magnet after the foreign objects caught by the magnet electrically connect the magnet to the casing.

Thus, it is impossible to sufficiently prevent entry of foreign objects that have not been attracted to the magnet into the operation mechanism.

Under such circumstances, an object of the present invention is to reliably prevent foreign objects such as iron dust produced in a rolling hearing from flowing into an operation mechanism in the lubricating oil circulation path.

SUMMARY OF THE INVENTION

In order to achieve this object, the present invention provides an abnormality detection device for a roiling bearing that includes an outer ring, an inner ring, and rolling elements disposed in a bearing space between the outer ring and the inner ring, the abnormality detection device comprising: a filter configured to allow passage of lubricating oil in the bearing space, while preventing passage of metal pieces mixed in the lubricating oil; an electrical circuit including a pair of electrodes comprising a pair of permanent magnets spaced apart from each other and mounted to the filter, and electrical lines extending from the respective electrodes to a power source, the electrical circuit being configured to produce an electrical output that changes as the metal pieces are partially attracted to the permanent magnets; and a state detector configured to detect a change in the electrical output from the electrical circuit so as to detect a state of the metal pieces mixed in the lubricating oil before passing through the filter.

In one arrangement, the electrical circuit further comprises a resistor for voltage division, and the electrical output is a voltage-divided output from the electrical circuit.

In another arrangement, the electrical circuit further includes a circuit board having terminals thereon, the, pair of permanent magnets include, on surfaces of the respective permanent magnets, coating layers made of an electrically conductive material, and the coating layers are electrically connected to the terminals.

The state detector may be configured to determine whether or not the rolling bearing is in an abnormal state by comparing the detected value of the electrical output with a predetermined threshold value.

The abnormality detection device may further include: a data storage means (data storage server) configured to store information when the state detector determines that the rolling bearing is in an abnormal state; and a chronological change confirming means configured to confirm chronological changes in abnormal state of the rolling bearing based on past determination information stored in the data storage means.

Advantages of the Invention

With the abnormality detection device according to the present invention, metal pieces mixed into the lubricating oil in the bearing space of the rolling bearing are attracted to the pair of magnets attached to the filter, and as the amount of the metal pieces attracted to the magnets increases, the electrical, output of the electrical circuit changes.

The state detector detects the change in the electrical output to detect the state of the metal pieces in the lubricating oil in the bearing space. This enables continuously monitoring foreign objects produced and/or accumulated in the rolling bearing, and thus makes it possible to take appropriate countermeasures based on the results of detection. This in turn makes it possible to, reliably prevent entry of foreign objects produced in the rolling bearing such as iron dust and peel-off pieces into an operation mechanism in the lubricating oil circulation path.

Simultaneously, it is possible to detect any abnormality of the rolling bearing based on a change in electrical output of the electrical circuit, which enables timely replacement of the bearing, and thus proactively preventing failure of parts of devices in the lubricating circulation path.

DETAILED DESCRIPTION OF THE INVENTION

Figure 1:
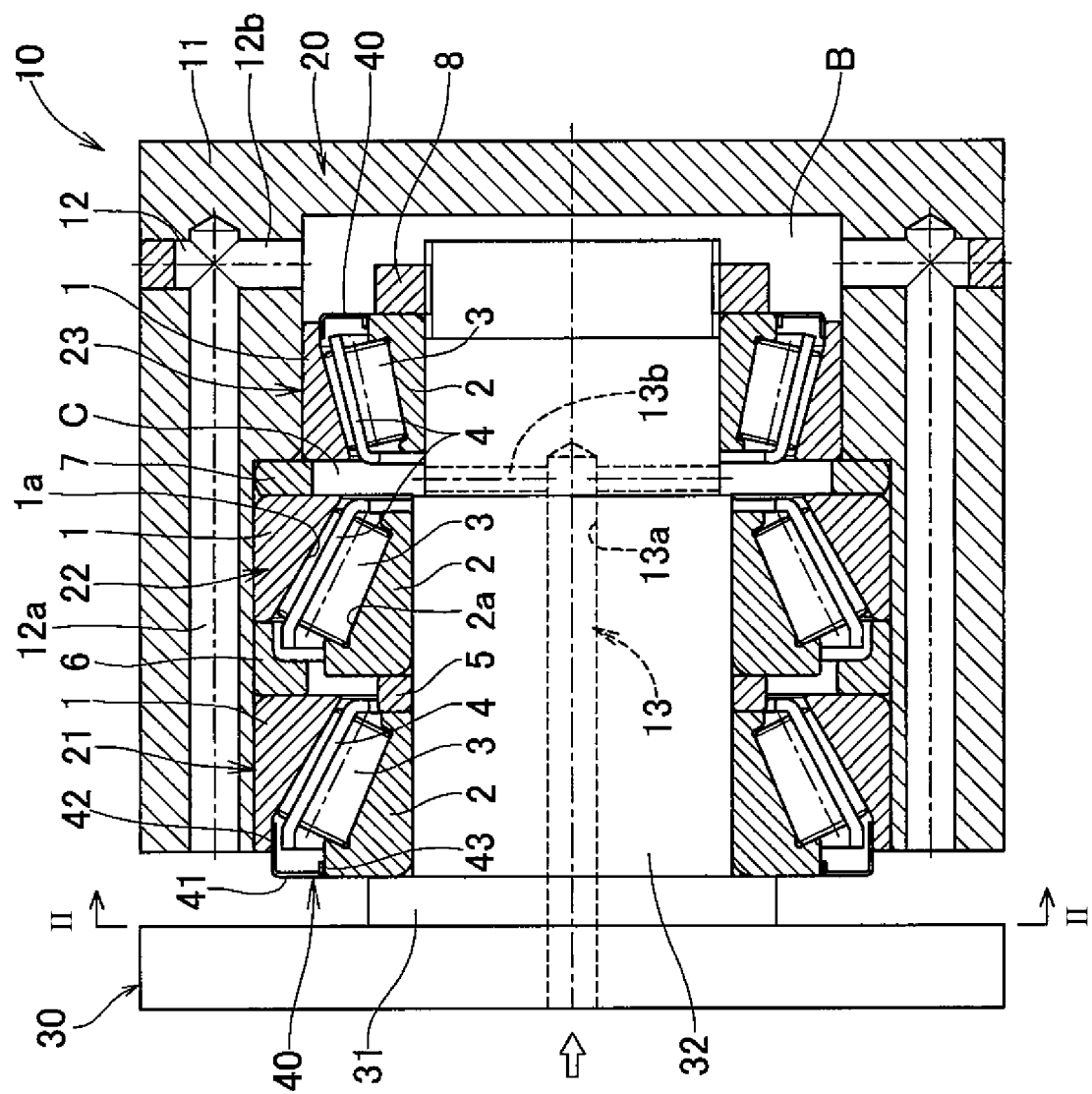
FIG. 1 is a sectional view of an oil pump using abnormality detection devices according to the present invention.

An abnormality detection device for a rolling bearing embodying the present invention is described with reference to the drawings. In FIG. 1, the abnormality detecting device is used in an oil pump 10 oil pump The oil pump 10 includes, in its interior, a bearing unit 20, and an operation mechanism 30 for the oil pump 10.

The bearing unit 20 includes three rolling bearings 21, 22 and 23 arranged in juxtaposition with each other in a fixed housing 11, and lubricated by oil. A shaft member 32 is connected to the operation mechanism 30 and supported by the roiling bearings 21, 22 and 23 so as to be rotatable about the center axis of the shaft member 32 relative to the fixed housing 11.

Each rolling bearing 21, 22, 23 includes rolling elements 3 disposed between the raceway 1a of the outer ring 1 and the raceway 2a of the inner ring 2. The rolling elements 3 are received in pockets (not shown) of a cage 4 so as to be retained in the circumferential direction of the bearing by the cage 4.

The outer rings 1 of the rolling bearings 21, 22 and 23 are press-fitted and fixed to the radially inner surface of the housing 11 so as to be non-rotatable relative to the housing 11. The inner rings 2 of the rolling bearing 21, 22 and 23 are press-fitted and fixed to the outer periphery of the shaft member (rotary shaft) 32 so as to be non-rotatable relative to the shaft member 32.

The rolling bearings 21, 22 and 22 used in the oil pump 10 shown are tapered roller bearings, which include tapered rollers as the rolling elements 3, but rolling bearings other than tapered roller bearings may be used. Also, the number of rolling bearings may be freely altered according to the specifications of the device.

The operation mechanism 30 of the oil pump 10 includes a pump rotor (not shown) rotatably mounted in a pump casing so as to send lubricating oil into a lubrication path. The pump rotor is rotatable about the center axis of the shaft member 32 by being connected to a connection member 31 at an end of the shaft member 32. A driving force is transmitted to the pump rotor from a driving source (not shown).

As illustrated in FIG. 1, among the three rolling bearings 21, 22 and 23, the rolling bearings 21 and 22, which are located axially closer to a first axial end of the oil pump 10 where the operation mechanism 30 is located, are arranged, such that the small-diameter end surfaces of the tapered rollers of the rolling bearings 21 and 22 are located, axially farther from the first axial end of the oil pump 10 than their large-diameter end surfaces.

The other rolling bearing 23, which is located axially closest to the second axial end of the oil pump 10 opposite from its first axial end (i.e., farthest from the operation mechanism 30, is arranged such that the small-diameter end surfaces of the tapered rollers of the rolling bearing 23 are located closer tea the operation mechanism 30 than their large-diameter end surfaces. In other words, the rolling bearings 21 and 22 are arranged in a back-to-back relationship with the rolling bearing 23, which means that the small-diameter end surfaces of the tapered rollers of the bearings 21 and 22 face the small-diameter end surfaces of the tapered rollers of the bearing 23.

Therefore, the rolling bearings 21 and 22 are arranged such that the distance between the raceway 1a of the outer ring 1 and the raceway 2a of the inner ring 2 decreases in the direction away from the operation mechanism 30, whereas the rolling bearing 23 is arranged such that the distance between the raceway 1a of the outer ring 1 and the raceway 2a of the inner ring 2 increases in the direction away from the operation mechanism 30.

As illustrated in FIG. 1, spacers 5 and 6 are disposed between the axially adjacent rolling bearings 21 and 22, and a spacer 7 is disposed between the axially adjacent rolling bearings 22 and 23.

Specifically, the spacer 5 is disposed between the radially inner portions of the rolling bearings 21 and 22 so as to abut the end surfaces of the inner rings 2 of the rolling bearings 21 and 22. The spacer 6 is disposed between the radially outer portions of the rolling bearings 21 and 22 so as to abut the end surfaces of the outer rings 1 of the rolling bearings 21 and 22.

The spacer 7 is disposed between the radially outer portions of the rolling bearings 22 and 23 so as to abut the end surfaces of the outer rings 1 of the rolling bearings 22 and 23.

A first axial end of the rolling bearing 21 that is closer to the first axial end of the oil pump than its second axial end is fixed in position by the end surface of the flange-shaped connection member 31, which is on the end of the shaft member 32, and a second axial end of the rolling bearing 23 that is located closer to the second axial end of the oil pump 10 than its first axial end is fixed in position by the end surface of a presser 8 so that the rolling bearings 21, 22 and 23 are axially immovable relative to the shaft member 32.

By fixing these ends by the connection member 31 and the presser 8, a preload is applied to the respective rolling bearings 21, 22 and 23, The shaft member 32, supported by the housing 11 through the rolling bearings 21, 22 arid 23, is connected to the operation mechanism 30 of the oil pump 10. The oil pump is capable of sending lubricating oil contained in the oil pump to an external operation mechanism.

The lubricating oil sent out of the oil pump flows through a lubricating oil circulation path to lubricates operation mechanisms, and returns to the oil pump.

In this oil pump 10, the bearing unit 20 and the operation mechanism 30 are lubricated by common lubricating oil. The operation mechanism 30 and the bearing space of the bearing unit 20 communicate with each other through circulation paths 12 and 13 through which lubricating oil circulates. The lubricating oil is also sent to the external operation mechanism.

The circulation path 13 shown comprises an, axial circulation path, portion 13a axially extending from the operation mechanism 30 such that the center axis of the path portion 13a is located on the center axis of the shaft member 32, and radial circulation path portions 13b extending radially outwardly from the end of the axial circulation path portion 13a, and open to the outer peripheral surface of the shaft member 32.

The radial circulation path portions 13b open to or communicate with the annular space C defined between the rolling bearings 22 and 23. Therefore, the circulation path 13 communicates through the annular space C, with the bearing spaces of the rolling bearings close to the first axial end of the oil pump 10 (left side of FIG. 1), i.e., the rolling bearings 21 and 22, and with the bearing space of the rolling bearing close to the second axial end of the oil pump 10 (right side of FIG. 1), i.e., the rolling hearing 23.

The lubricating oil that has passed through the annular space C, and then through the bearing space of the rolling bearing 23 flows, through the opening of the bearing space of the rolling bearing 23 at its second axial end into a housing end space B defined between the second axial end of the rolling bearing 23 and the housing 11. Thereafter, the lubricating oil flows through circulation paths 12 in the housing 11, and returns to the operation mechanism 30.

Each circulation path 12 comprises a radial circulation path portion 12b extending radially outwardly from the housing end space B, and an axial circulation path portion 12a extending in the direction of the center axis of the shaft member 32, from the radial circulation path portion 12b.

The lubricating oil that has passed through the annular space C, the bearing space of the rolling bearing 22, and the bearing space of the rolling bearing 21 returns, through the opening of the bearing space of the rolling bearing 21 at the first axial end thereof, to the operation mechanism 30.

Thus, the operation mechanism 30, and the rolling bearings 21, 22 and 23 of the bearing unit 20 are lubricated by common lubricating oil.

Foreign objects such as wear dust (including iron dust) of peel-off pieces may be produced in the bearing spaces of the rolling bearings 21, 22 and 23. It is not preferable that such foreign objects enter the operation mechanism 30 and/or other operation mechanisms in the circulation path.

In order to prevent foreign objects from entering these mechanisms, seal rings 40 each having a filter 45 (shown in FIG. 2) are attached, respectively, to the opening of the bearing space of the rolling bearing 21 at the first axial end thereof, and the opening of the bearing space of the rolling bearing 23 at the second axial end thereof. These seal rings 40 have the same structure, as described below.

The seal rings 40 are attached to the respective rolling bearings 21 and 23 so as, to cover the above openings of the bearing spaces of the rolling bearings 21 and 23. These openings are annular-shaped openings defined, respectively, along the raceway 1a, of the outer ring 1 and the raceway 2a of the inner ring 2 of a respective one of the rolling bearings 21 and 23. Therefore, the seal rings 40, covering these, openings, are also annular-shaped.

The seal rings 40 shown are made of a synthetic resin, and are each attached between the large-diameter flange of the inner ring 2 and the large-diameter end of the radially inner surface of the outer ring 1.

The outer rings I of the bearings 21, 22 and 23 are stationary, and the inner rings 2 of the bearings 21, 22 and 23 are rotatable. The seal rings 40 are fixed, in the embodiment, to the stationary outer rings 1 of the respective bearings 21 and 23 by e.g., fitting, but may be fixed to the rotatable inner rings 2 of the respective bearings 21 and 23 by e.g., fitting.

As illustrated in FIG. 1, each seal ring 40 includes an engagement portion 42 engaging the outer ring 1; a wall portion 41 extending radially inwardly from the engagement portion 42; and an inner cylindrical portion 43 extending from the wall portion 41 so as to be opposed to the radially outer surface of the inner ring 2.

The engagement portion 42 is a cylindrical member press-fitted to the inner diameter surface of the outer ring 1. The engagement portion 42 may be fixed to the outer ring 1 by fitting e,g., a protrusion or protrusions on the radially outer surface of the engagement portion 42 into a seal groove or grooves in the large-diameter end of the radially inner surface of the outer ring 1.The inner cylindrical portion 43, located at the radially inner portion of the seal ring 40, is in sliding contact with, or opposed, through a minute gap, to the radially outer surface of the large-diameter flange of the inner ring 2.

Figure 2:
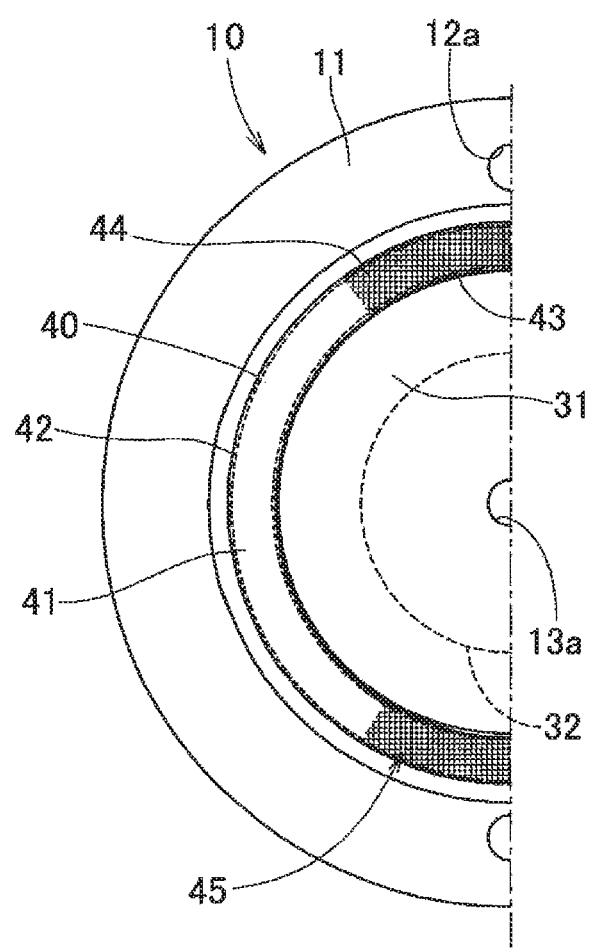
FIG. 2 is an enlarged sectional view taken along line II-II of FIG. 1

As shown in FIG. 2, the filter 45 of each seal ring 40 is a mesh comprising a large number of through holes 44 formed in the wall portion 41 of the seal ring 40 to prevent foreign objects in the bearing spaces of the rolling bearings 21, 22 and 23 from passing through the through holes 44, while allowing lubricating oil, to pass through the through holes 44.

The maximum value of the diameters of the through holes 44 is determined such that only foreign objects which will not adversely affect the operation mechanism 30 even if it enters the operation, mechanism 30 is allowed to pass through the through holes 44.

Figure 3:
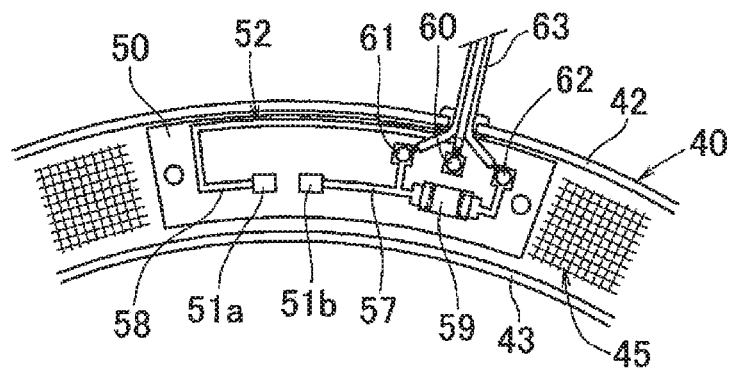
FIG. 3 shows a front view of a detecting portion of one of the abnormality detection devices shown in FIG. 1.
Figure 4:
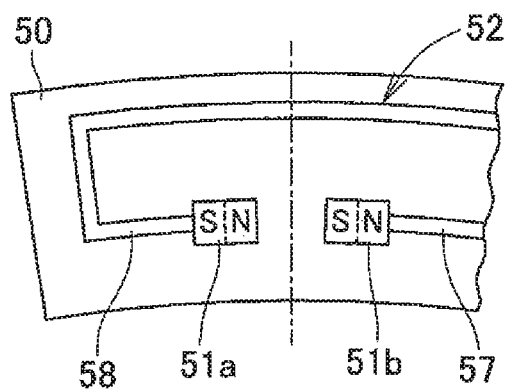
FIG. 4 schematically shows, in front view, a circuit board, and a pair of electrodes each comprising a permanent magnet.

FIG. 3 shows an electrical circuit 52 including a pair of permanent magnets 51a and 51b disposed on the inner side surface of the filter 45 of each seal ring 40 so as to be spaced apart from each other.

Figure 8:
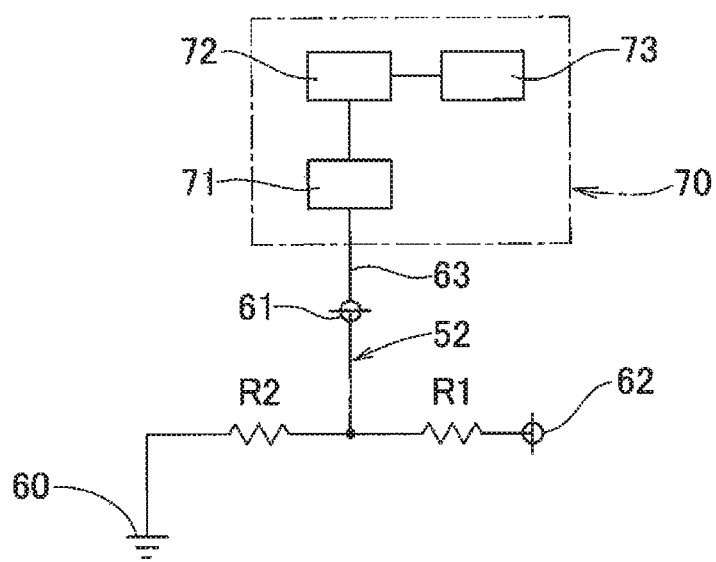
FIG. 8 is a circuit diagram of the electrical circuit.
Figure 9A:
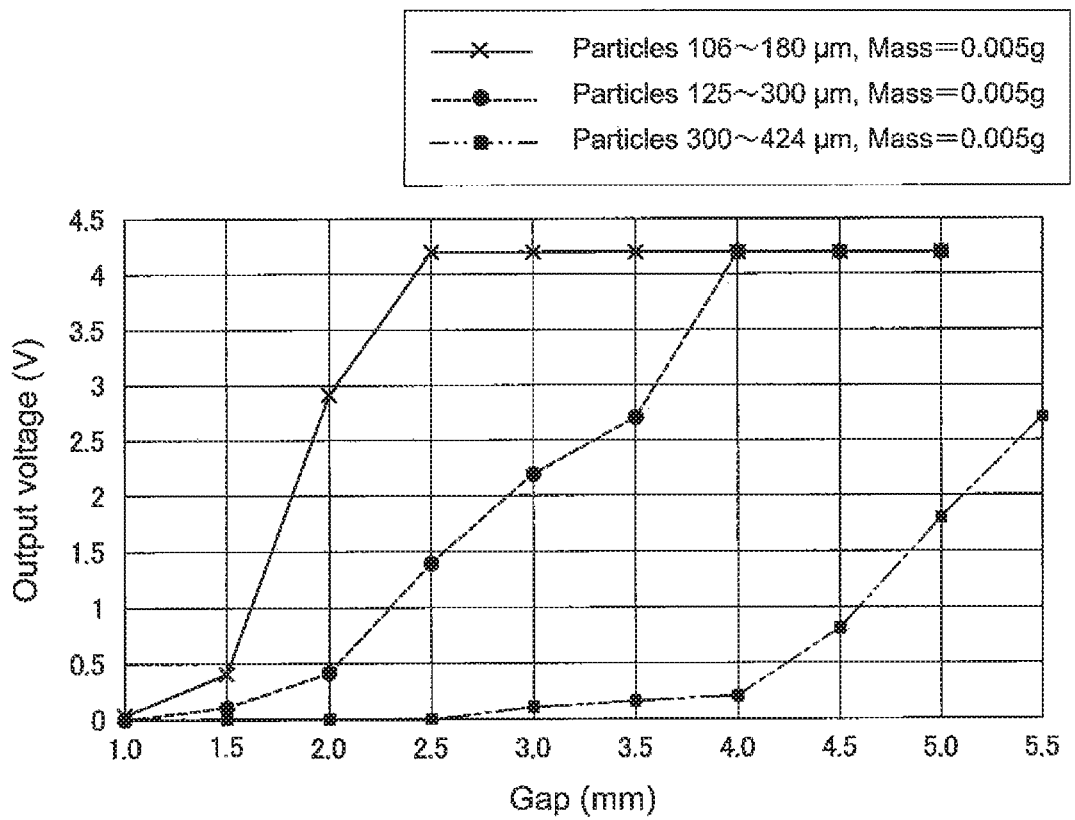
FIG. 9A-9D are graphs showing how the output voltage of the electrical circuit changes with a change in the particle size of foreign objects attracted to the pair of permanent magnets, and a change in the gap between the foreign objects attracted to one permanent magnet and those attracted to the other permanent magnets.
Figure 9B:
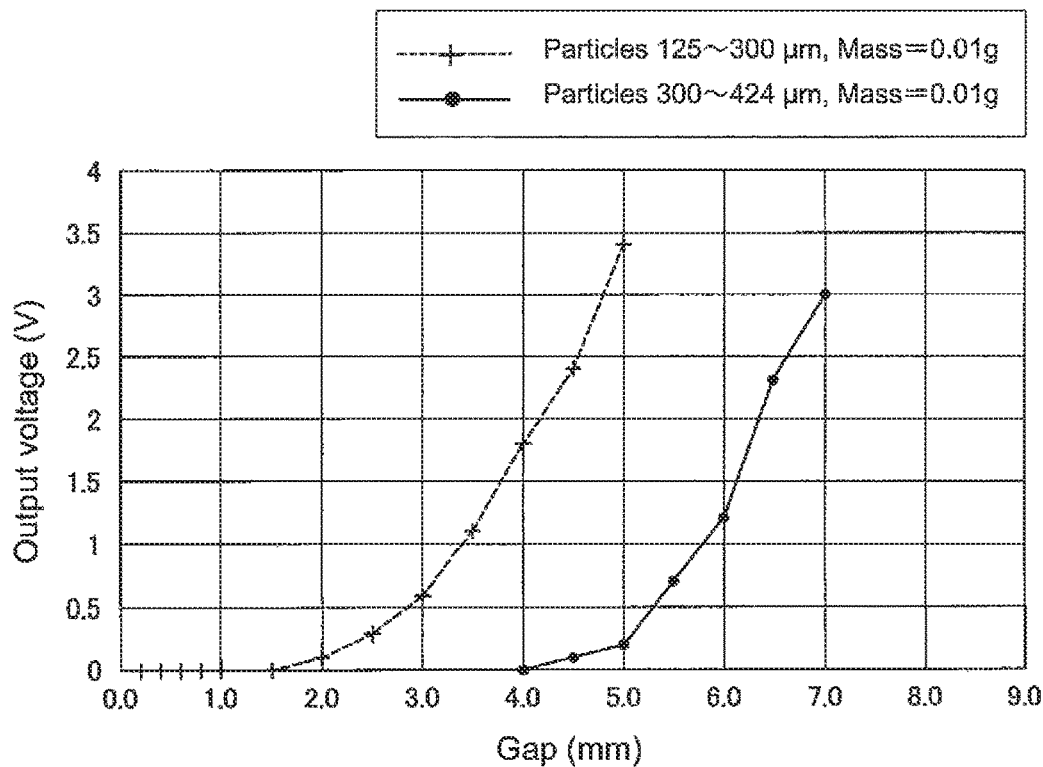
Figure 9C:
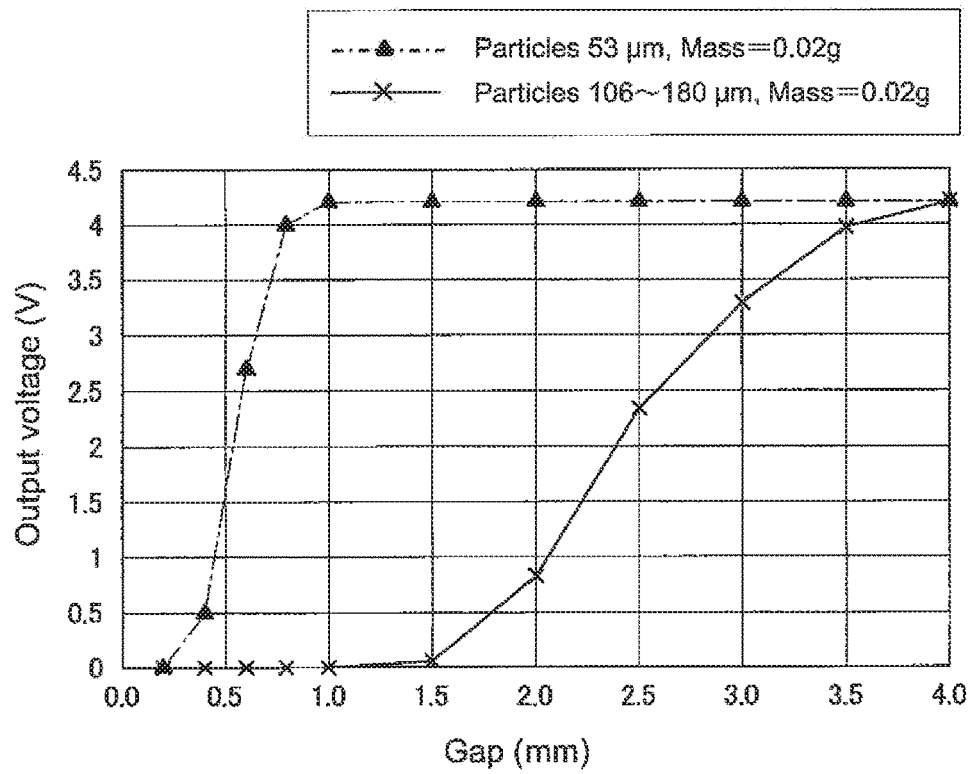
Figure 9D:
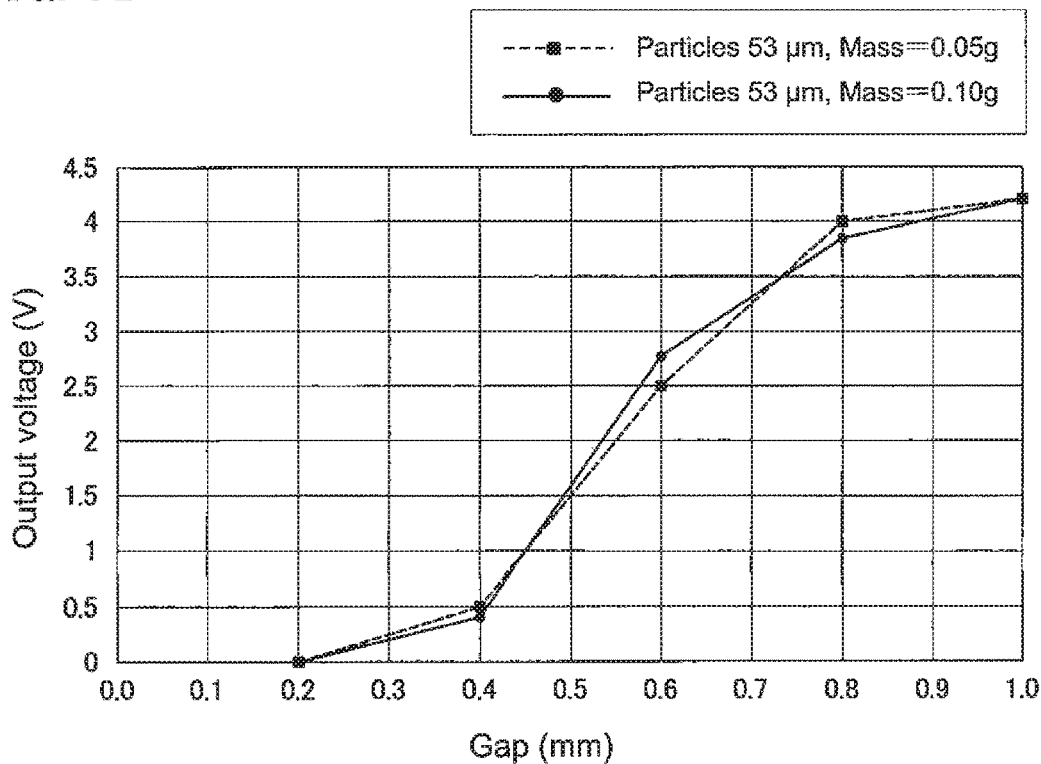
Figure 10A:
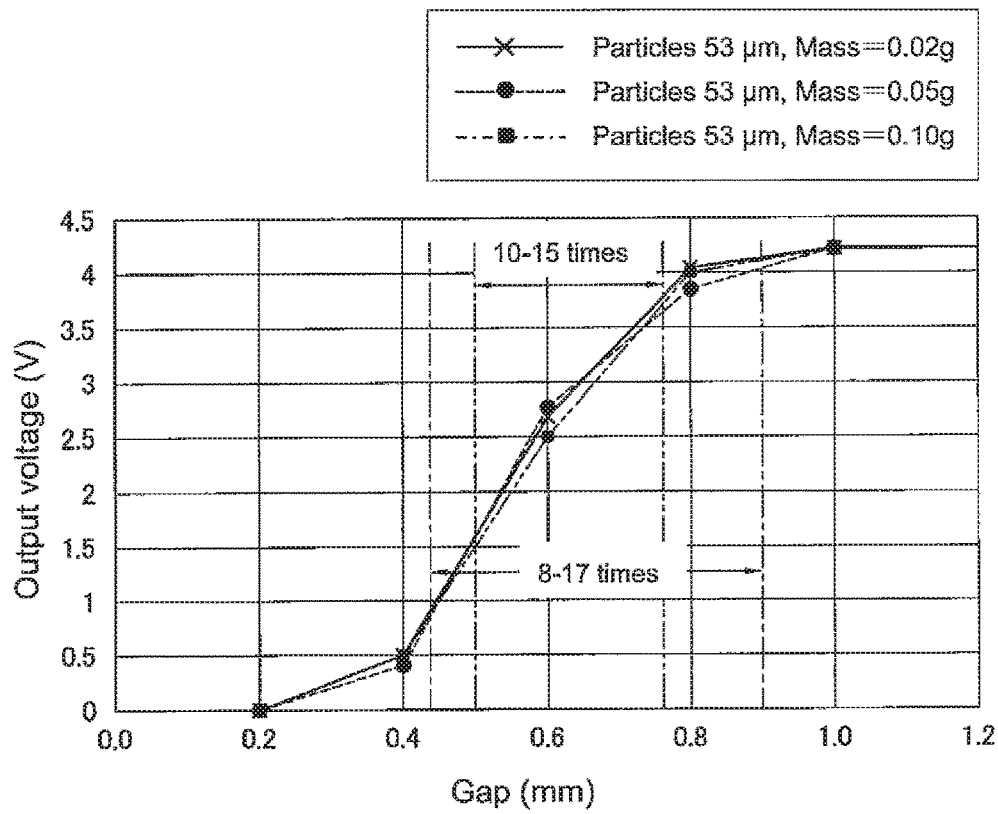
FIG. 10A-10D are graphs showing how the output voltage of the electrical circuit changes with a change in the particle size of foreign objects attracted to the pair of permanent magnets, and a change in the gap between the foreign objects attracted to one permanent magnet and those attracted to the other permanent magnets.
Figure 10B:
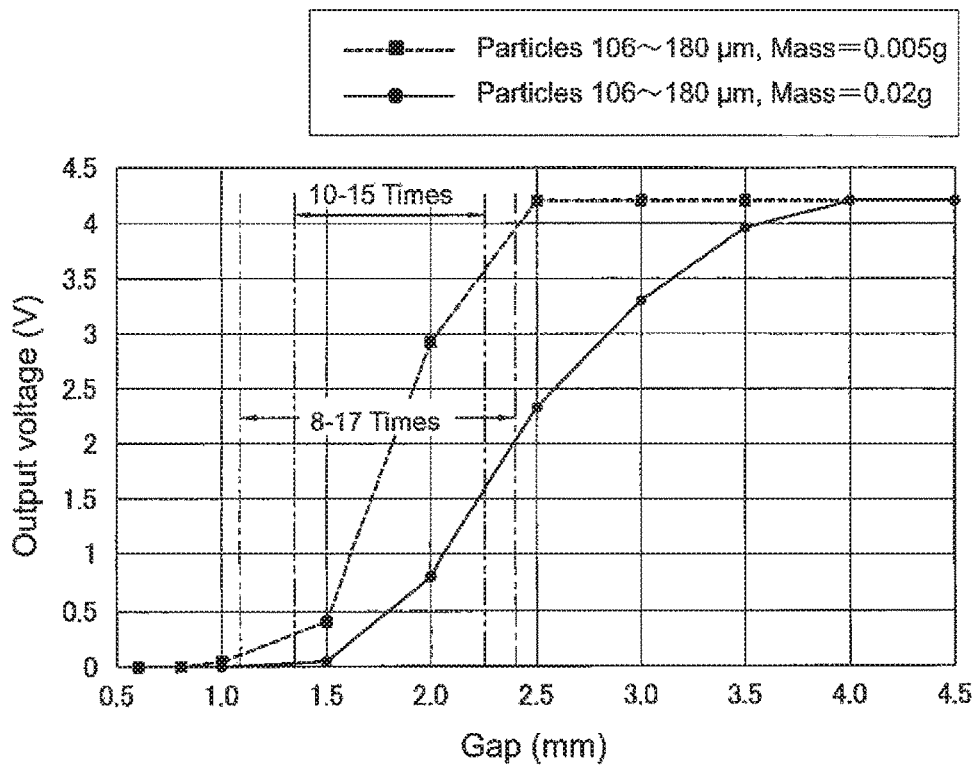
Figure 10C:
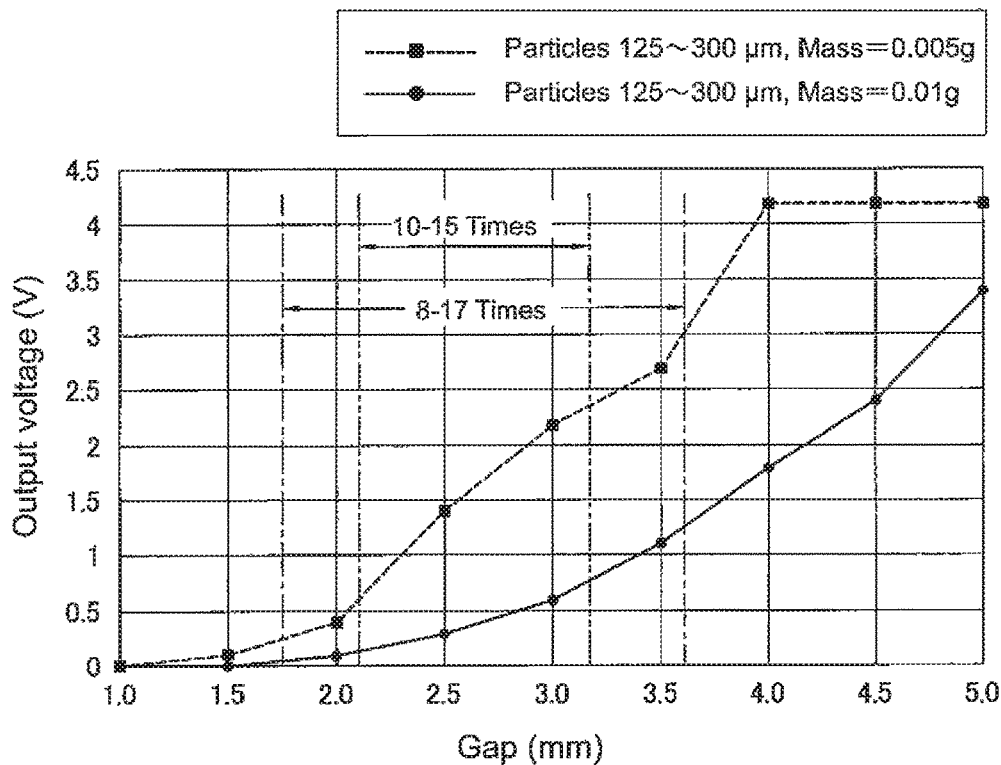
Figure 10D:
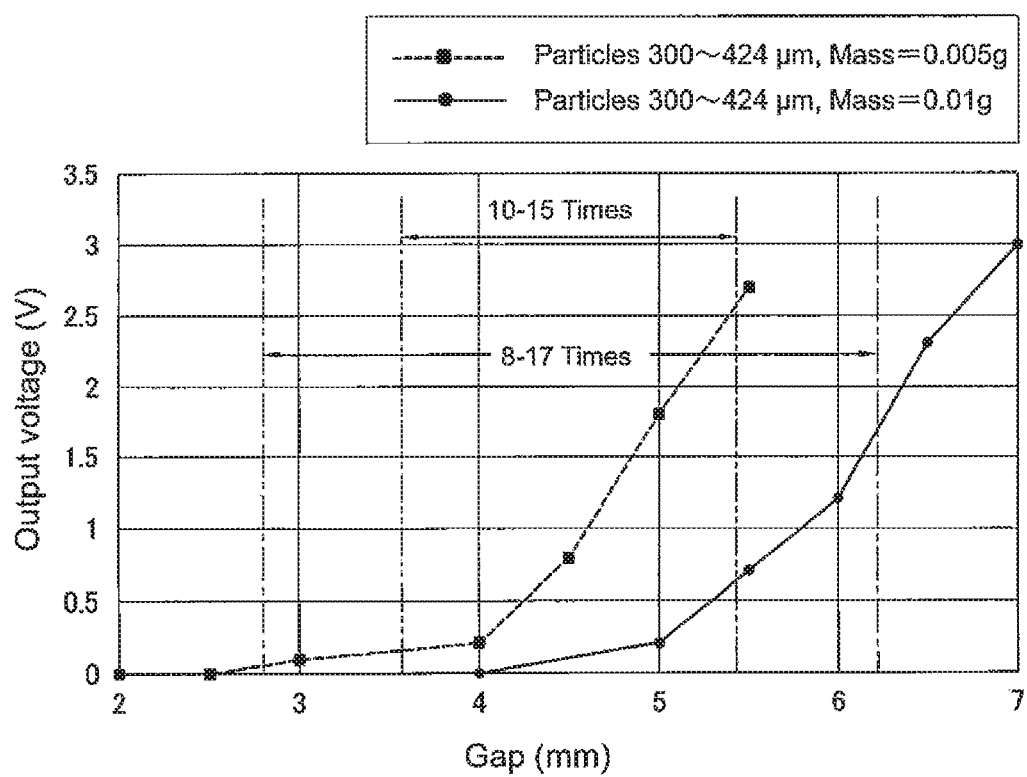

The electrical circuit 52 further includes electrical lines extending to a power source from the pair of permanent magnets 51a and 51b, which function as electrodes, and is controlled by a control means 70 (shown in FIG. 8).

The permanent magnets 51a and 51b, and the electrical lines 57 and 58 connected to the permanent magnets 51a and 51b to supply electricity to the permanent magnets are mounted on a circuit board 50. The electrical lines of the electrical circuit 52 extend from the circuit board 50 to the outside of the rolling bearing 21, 23, and the portions of the electrical lines of the electrical circuit 52 extending to the outside of the rolling bearing, and the control means 70 are mounted to a stationary member (fixed member) such as the housing 11 or a frame near the housing 11.

The permanent magnets 51a and 51b function to attract foreign objects such as iron dust or iron pieces, and further function, as electrodes of the electrical circuit 52, to detect the adhesion of foreign objects to the permanent magnets. In other words, the permanent magnets 51a and 51b have a magnetic force sufficient to attract metal, and include surface coating layers (conductive layers) made of an electrically conductive material. The coating layers are electrically connected to terminals and the electrical lines of the electrical circuit 52.

The permanent magnets 51a and 51b may be Nd magnets having their surfaces plated with nickel. This type of permanent magnets 51a and 51b make it possible to solder electrical lines formed by the pattern circuit on the circuit board 50 to the magnets.

Since nickel plating is an excellent conductor, this type of permanent magnets 51a and 51b can more reliably detect the adhesion of foreign objects thereto. More preferably, the coating layers covering the surfaces of the permanent magnets 51a and 51b comprise gold, silver or copper plating. Alternatively, the permanent magnets 51a and 51b may be entirely made of an electrically conductive material.

As illustrated in FIG. 3, which shows the wiring pattern, the permanent magnets 51a and 51b, a resistor for voltage division, and portions of the electrical lines of the electrical circuit are fixed to the circuit board 50 by soldering. The circuit board 50 is fixed to the filter 45 by heat, caulking heat fusion). Otherwise, although not shown, the circuit board 50 may be integral with the filter 45. Further alternatively, although not shown either, the electrical circuit itself may be directly provided on the filter 45.

In order to enable the permanent magnets to more effectively attract foreign objects thereto, the circuit board 50 is preferably fixed to one of the opposite surfaces of the wall portion 41 facing the bearing space.

The distance L (shown in FIG. 6) between the permanent magnets 51a and 51b is not particularly limited, but is preferably within the range of 8 to 17 times the sizes of magnetic pieces, such as non pieces, attracted to and caught by the permanent magnets (such magnetic pieces are supposed to have an average particle size of about 50 to 350 micrometers). It has been verified by experiments that by determining the distance L within the above range, foreign objects can be detected in a favorable manner. For the below-described reasons, the distance L is more preferably within the range of 10 to 15 times the sizes of the foreign objects.

The permanent magnet 51a is connected to one end of an electrical line 58 formed on the circuit board 50. The other opposite end of the electrical line 58 is connected to a ground (GND) terminal 60.

An electrical line 57 is connected to n output terminal 61 constituting a portion of a voltage dividing circuit.

FIG. 8 illustrates a diagram of the electrical circuit, in which R1 indicates the electrical resistance of the resistor 59 for voltage division, and R2 indicates the electrical resistance between the permanent magnets 51a and 51b.

The control means 70 controls the electrical circuit 52 through cables 63 extending to the control means 70 from an input terminal (power source) 62, the GND terminal 60, and the output terminal 61.

Figure 5:
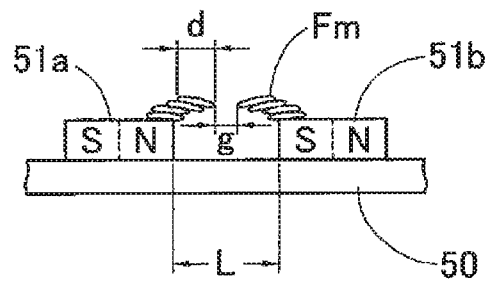
FIG. 5 schematically shows how iron dust is attracted to the electrodes.
Figure 6:
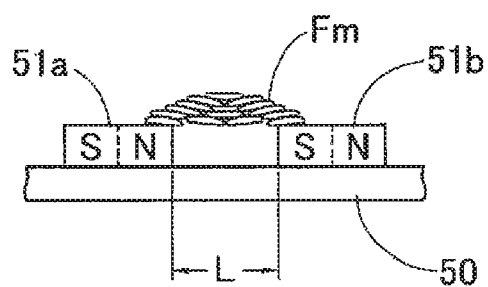
FIG. 6 schematically shows a state in which the pair of electrodes are short-circuited by the attracted iron dust.

The control means 70 includes a state detector 71 configured to detect an output from the voltage dividing circuit of the electrical circuit 52, When, as shown in. FIGS. 5 and 6, foreign objects Fm such as metal pieces adhere to the pair of permanent magnets 51a and 51b, and as the amounts of foreign objects Fm adhered to the permanent magnets increase, the electrical output from the electrical circuit 52 changes. The state detector 71 receives this electrical data, and determines the state of foreign objects Fm mixed, in the lubricating oil (such as their content).

The electrical output detected by the state detector 71 is a voltage-divided output from the electrical circuit 52. For example, the voltage-divided output is the electric potential of the output terminal 61 (after being stepped down by the electrical resistance R1), the output terminal being located between the input terminal (power source) 62 of which the electric potential is E (V) and, the GND terminal 60 of which the electric potential is 0 (V).

When lubricating oil flows through the bearing spaces of the rolling bearings, and passes through the through holes 44 of the filter 45 of the seal ring 40 which carries the electrical circuit 52, if the lubricating oil contains foreign objects capable of being attracted to magnets, such as iron dust or peel-off pieces (iron pieces), such foreign objects adhere to the permanent magnets 51a and 51b, causing an electrical short-circuit between the opposed permanent magnets (electrodes), so that the resistance value between the opposed electrodes decreases.

The electrical resistance between the pair of permanent magnets 51a and 51b changes according to how iron dust, separated iron pieces, etc. are attracted to the magnets. Generally speaking, if the amount of foreign objects attracted to the pair of magnets is small, since the sectional area of the portion of the foreign objects through which electric current can pass is small, the resistance value tends to be large. On the other hand, if the amount of foreign objects attracted to the pair of magnets is large, since the sectional area of the portion of the foreign objects through which electric current can pass is large, the resistance value tends to be small.

Figure 7:
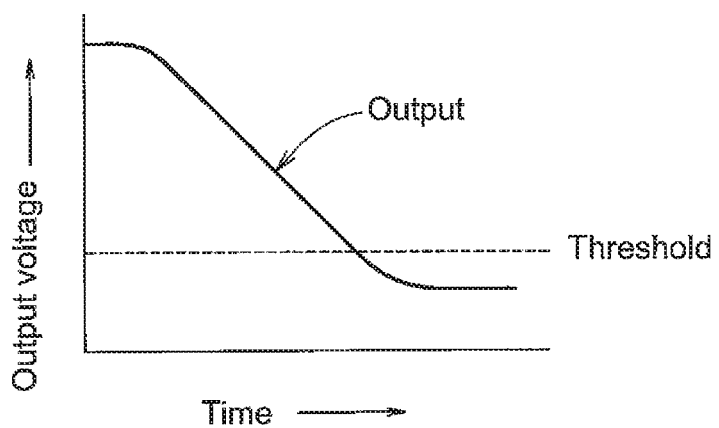
FIG. 7 is a graph showing how an electrical output of an electrical circuit changes.

For example, as the amount of foreign objects Fm attracted to the permanent magnets increases from the state shown in FIG. 5 to the state shown in FIG. 6, the electrical resistance value between the permanent magnets 51a and 51b decreases, that is, the electric potential of the output terminal 61 gradually decreases with time as shown in FIG. 7, so that the output voltage detected by the state detector 71 also decreases.

Thus, by comparing the electric potential (voltage-divided output) of the output terminal 61 with the electric potential of the input terminal (power source) 62 and the electric potential of the GND terminal 60, it is possible to estimate the amount of foreign objects attracted to the magnets.

It is possible to calculate beforehand, through e.g., experiments, the output voltages (electric potentials of the output terminal 61=voltage-divided outputs) for certain amounts of foreign objects attracted to the magnets. The thus-obtained information may be stored in the below-described data storage means 72.

This enables the state detector 71 to determine that the rolling bearings are in an abnormal state if the electrical, output from the output terminal 61 falls below a predetermined threshold of the output voltage.

The control means 70 further includes the above-mentioned data storage means 72, which is configured to store information when the state detector 71 determines that the rolling bearings are in an abnormal state; and a chronological change confirming means 73 configured to confirm the chronological changes in the abnormal state of the rolling bearings based on the past determination information stored in the data storage means 72 regarding the past abnormality determination by the state detector 71.

This enables the c means 70 to detect, for each bearing, for each bearing unit 20, the relationship between the output voltage (electric potential of the output terminal 61=voltage-divided output) and the amount of foreign objects attracted to the magnets, and to determine the remaining operating time of the bearing unit 20 until an abnormal state is detected.

FIGS. 9A-9D and 10A-10D are graphs showing how the output voltage of the electrical circuit changes according a change in particle sizes of the foreign objects Fm attracted to the pair of permanent magnets 51a and 51b, and a change in size of the gap between the foreign objects attracted to the permanent magnet 51a and those attracted, to the permanent magnet 51b. Based on these data, the distance L between the pair of permanent magnets is determined preferably at 8-17 times, particularly preferably at 10-15 times, the sizes (d in FIG. 5) of the foreign objects Fm attracted to and caught by the permanent magnets 51a and 51b.

As is apparent from FIGS. 9A-9D and 10A-10D, with the passage of time, the amount of foreign objects Fm attracted to the permanent magnets 51a and 51b increases; the gap g (see FIG. 5) between the foreign objects Fm attracted to the permanent magnet 51a and those attracted to the permanent magnet 51b correspondingly decreases; and as a result, the output voltage decreases. If the output voltage falls below the threshold, the control means 70 determines that the rolling bearings are in an abnormal state, and sends a warning.

Output voltage "Vout" in the voltage dividing circuit is expressed by: Vout=[R1/{R1±R2)}]×VDD, where VDD is the input voltage, which is the difference between the electric potential of the input terminal (power source) 62 and the electric potential of the GND terminal 60.

By storing such determination data/information, the data storage means 72 and the chronological change confirming means 73 are capable of utilizing the stored data/information in the next determination or warning transmission.

FIGS. 10A-10D indicate that the distance L between the permanent magnets 51a and 51b is most preferably 10-15 times the sizes of the foreign objects.

While, in the oil pump 10 shown, two filters 45 are provided on the respective seal rings 40, which close the openings of the bearing spaces of the respective rolling bearings 21 and 23, instead of such filters 45, a filter or filters 45 may be provided at a portion or portions of the oil pump 10 other than the seal rings 40. For example, filters 45 capable of catching foreign objects may be provided in the circulation paths 12 and 13, and an abnormality detection device as described above may be mounted to each of such filters 45.

The abnormality detection device for a rolling bearing according to the present invention may be used in a device other than an oil pump, particularly in various kinds of devices which need to prevent foreign objects, such as iron dust and other wear dust, produced in rolling bearings from entering an operation mechanism in the lubricating oil circulation path.

DESCRIPTION OF REFERENCE NUMERALS

1: outer ring
1a, 2a: Raceway
2: inner ring
3: rolling element
4: cage
5, 6, 7: spacer
8: presser
10: oil pump
11: housing
12, 13: circulation path
20: bearing unit
21, 22, 23: rolling bearing
30: operatic mechanism
31: connection ember
32: shaft member
40: seal ring
41: wall portion
42: engagement portion
43: inner cylindrical portion
44: through hole
45: filter
50: circuit board
51a, 51b: permanent magnet
52: electrical circuit
60: CND terminal
70: control means
71: state detector
72: data storage means
73: chronological change confirming cans
Fm: magnetic foreign objects
d: size of foreign object
g: gap between the foreign objects attracted to the two respect permanent, magnets
L: distance between the two permanent magnets

What is claimed is:
1. An abnormality detection device for a rolling bearing that includes an outer ring, an inner ring, and rolling elements disposed in a bearing space between the outer ring and the inner ring,
the abnormality detection device comprising:
a filter configured to allow passage of lubricating oil in the bearing space, while preventing passage of metal pieces mixed in the lubricating oil;
an electrical circuit including a pair of electrodes comprising a pair of permanent magnets spaced apart from each other and mounted to the filter, and electrical lines extending from the respective electrodes to a power source, the electrical circuit being configured to produce an electrical output that changes as the metal pieces are partially attracted to the permanent magnets; and
a state detector configured to detect a change in the electrical output from the electrical circuit so as to detect a state of the metal pieces mixed in the lubricating oil.

2. The abnormality detection device of claim 1, wherein a distance between the pair of permanent magnets is 10-15 times sizes of foreign objects produced in the bearing space.

3. The abnormality detection device of claim 2, wherein the electrical circuit further comprises a resistor for voltage division, and wherein the electrical output is a voltage-divided output from the electrical circuit.

4. The abnormality detection device of claim 3, wherein the permanent magnets, the resistor for voltage division, and portions of the electrical lines are soldered to the circuit board, and wherein the circuit board is fixed to the filter by heat caulking.

5. The abnormality detection device of claim 3, wherein the state detector is configured to determine whether or not the rolling bearing is in an abnormal state by comparing the electrical output with a predetermined threshold value.

6. The abnormality detection device of claim 2, wherein the electrical circuit further includes a circuit board having terminals thereon,
wherein the pair of permanent magnets include, on surfaces of the respective permanent magnets, coating layers made of an electrically conductive material, and
wherein the coating layers are electrically connected to the terminals.

7. The abnormality detection device of claim 6, wherein the state detector is configured to determine whether or not the rolling bearing is in an abnormal state by comparing the electrical output with a predetermined threshold value.

8. The abnormality detection device of claim 2, wherein the state detector is configured to determine whether or not the rolling bearing is in an abnormal state by comparing the electrical output with a predetermined threshold value.

9. The abnormality detection device of claim 1, wherein the electrical circuit further comprises a resistor for voltage division, and wherein the electrical output is a voltage-divided output from the electrical circuit.

10. The abnormality detection device of claim 9, wherein the permanent magnets, the resistor for voltage division, and portions of the electrical lines are soldered to the circuit board, and wherein the circuit board is fixed to the filter by heat caulking.

11. The abnormality detection device of claim 9, wherein the electrical circuit further includes a circuit board having terminals thereon,
wherein the pair of permanent magnets include, on surfaces of the respective permanent magnets, coating layers made of an electrically conductive material, and
wherein the coating layers are electrically connected to the terminals.

12. The abnormality detection device of claim 11, wherein the permanent magnets, the resistor for voltage division, and portions of the electrical lines are soldered to the circuit board, and wherein the circuit board is fixed to the filter by heat caulking.

13. The abnormality detection device of claim 11, wherein the state detector is configured to determine whether or not the rolling bearing is in an abnormal state by comparing the electrical output with a predetermined threshold value.

14. The abnormality detection device of claim 9, wherein the state detector is configured to determine whether or not the rolling bearing is in an abnormal state by comparing the electrical output with a predetermined threshold value.

15. The abnormality detection device of claim 1, wherein the electrical circuit further includes a circuit board having terminals thereon,
wherein the pair of permanent magnets include, on surfaces of the respective permanent magnets, coating layers made of an electrically conductive material, and
wherein the coating layers are electrically connected to the terminals.

16. The abnormality detection device of claim 15, wherein the state detector is configured to determine whether or not the rolling bearing is in an abnormal state by comparing the electrical output with a predetermined threshold value.

17. The abnormality detection device of claim 1, wherein the state detector is configured to determine whether or not the rolling bearing is in an abnormal state by comparing the electrical output with a predetermined threshold value.

18. The abnormality detection device of claim 1, further comprising:
a data storage means configured to store information when the state detector determines that the rolling bearing is in an abnormal state; and
a chronological change confirming means configured to confirm chronological changes in abnormal state of the rolling bearing based on past determination information stored in the data storage means.

19. The abnormality detection device of claim 1, wherein the circuit board is integral with the filter.

20. The abnormality detection device of claim 1, wherein the electrical circuit has a wiring pattern, and wherein the wiring pattern, the permanent magnets, and the resistor for voltage division are integral with the filter.

* * * * *